Figure 1:
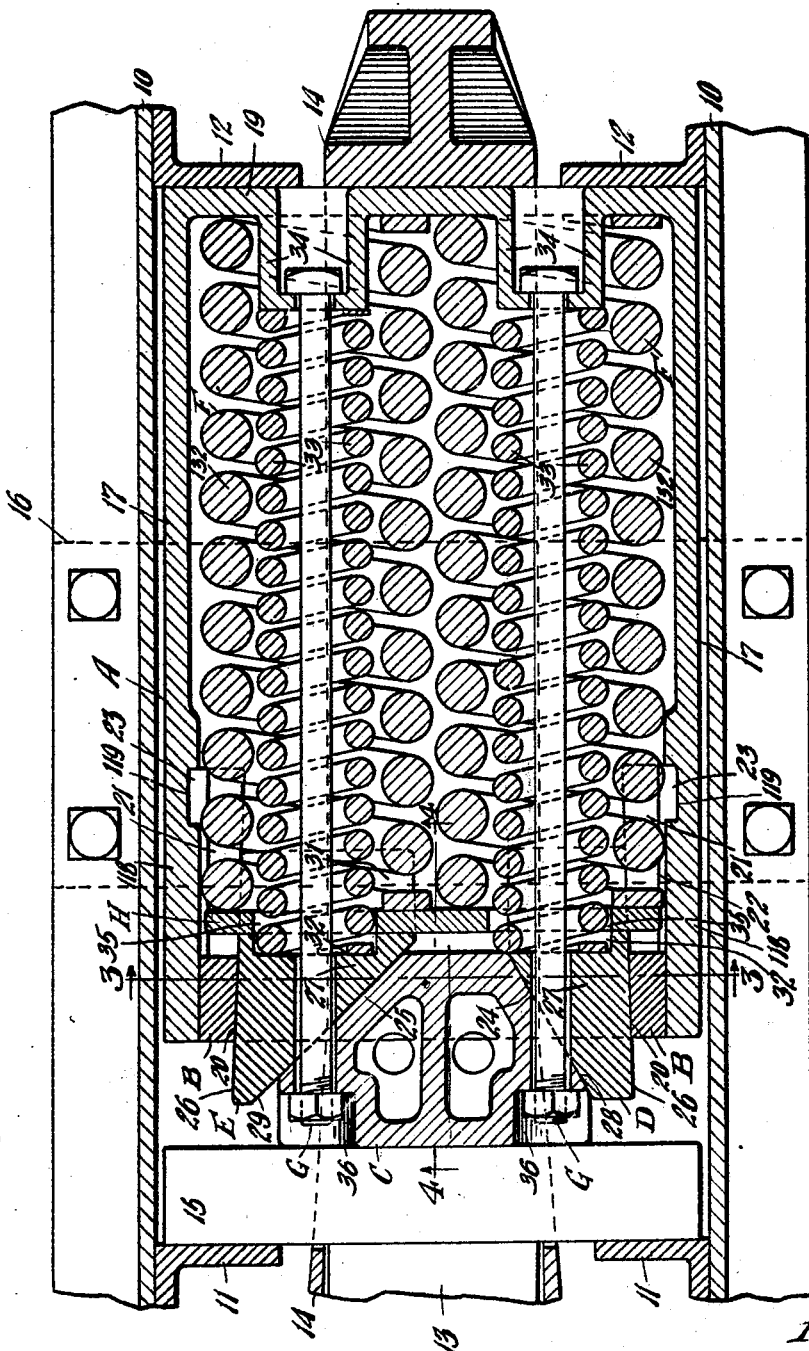

Feb. 28, 1928.

J. F. O'CONNOR 1,660,574

FRICTION SHOCK ABSORBING MECHANISM

Filed March 12, 1927   2 Sheets-Sheet 1

Witness
Wm. Geiger

Inventor
John F. O'Connor
By George I. Haight
His Atty.

Feb. 28, 1928.  1,660,574
J. F. O'CONNOR
FRICTION SHOCK ABSORBING MECHANISM
Filed March 12, 1927  2 Sheets-Sheet 2
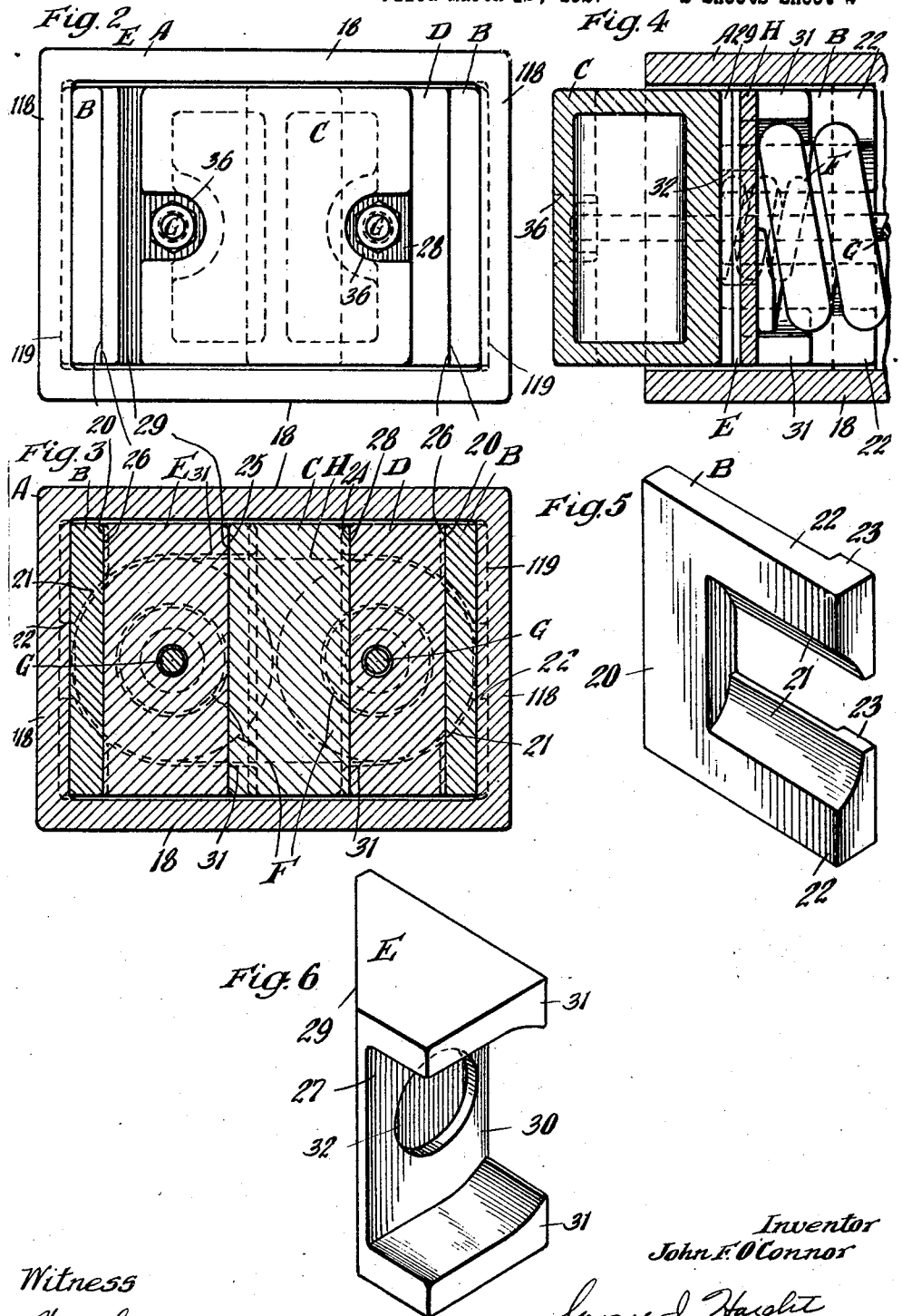
Inventor
John F. O'Connor
By George I. Haight
His Atty.
Witness
Wm. Geiger Patented Feb. 28, 1928.

1,660,574

UNITED STATES PATENT OFFICE.

JOHN F. O'CONNOR, OF CHICAGO, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed March 12, 1927. Serial No. 174,729.

This invention relates to improvements in friction shock absorbing mechanisms.

One object of the invention is to provide a friction shock absorbing mechanism especially adapted for railway draft riggings, including a spring cage, having a friction shell section at one end thereof provided with opposed friction surfaces with which a pair of friction shoes co-operate, the shoes being engaged by a wedge member and having their movement resisted by twin arranged springs disposed within the spring cage, wherein means of exceptional strength is provided in the form of a pair of retainer bolts for anchoring the wedge to the spring cage, the bolts being disposed at opposite sides of the wedge, thereby maintaining true contact between the wedge and shoes and concentrating the forces close to the walls of the shell, the bolts also extending longitudinally through the centers of the twin arranged springs, thereby permitting the use of relatively heavy bolts without reducing the available spring space of the cage.

Other objects and advantages of the invention will more fully and clearly appear from the description and claims hereinafter following.

In the drawings, forming a part of this specification, Figure 1 is a horizontal, longitudinal sectional view of a portion of a railway draft rigging showing my improvements in connection therewith. Figure 2 is a front end elevational view of the shock absorbing mechanism proper. Figure 3 is a transverse vertical sectional view corresponding substantially to the line 3—3 of Figure 1. Figure 4 is a longitudinal vertical sectional view of the front end portion of the shock absorbing mechanism proper, corresponding substantially to the line 4—4 of Figure 1. And Figures 5 and 6 are detailed, perspective views of a liner and one of the friction shoes employed in connection with my improved mechanism.

In said drawings, 10—10 indicate channel-shaped center or draft sills of a railway car underframe, to the inner sides of which are secured the usual front stop lugs 11—11 and rear stop lugs 12—12. The inner end of the draw-bar is designated by 13, to which is operatively connected a yoke 14 of well known form. The shock absorbing mechanism proper and a front main follower 15 are disposed within the yoke. The yoke and the parts therewithin are supported in operative position by a detachable saddle plate 16 fixed to the draft sills.

My improved shock absorbing mechanism proper comprises broadly: A spring cage A; a pair of liners B—B; a main wedge block C; two friction shoes D and E; twin arranged main springs F—F; a pair of retainer bolts G—G; and a spring follower H.

The spring cage A is in the form of a substantially hollow rectangular box-like casting having longitudinally disposed spaced vertical side walls 17—17, longitudinally extending horizontally disposed spaced top and bottom walls 18—18, and a transverse rear end wall 19. The end wall 19 co-operates with the stop lugs 12 in the manner of the usual rear follower. At the forward end of the spring cage A, the side walls 17 thereof are thickened as indicated at 118. The thickened portions 118 of the side walls are vertically slotted to provide seats 119—119 which co-operate with the liners B to anchor the liners to the cage A against longitudinal movement.

The liners B are two in number and are disposed at opposite sides of the cage. Each of the liners B is in the form of a heavy substantially plate-like member having a flat inner surface 20 adapted to co-operate with the corresponding friction shoe. The opposed surfaces 20 of the liners B are preferably converged inwardly of the mechanism as most clearly shown in Figure 1. On the inner side, the rear end portion of each liner B is cut away as indicated at 21 to provide clearance for the outer coil of the corresponding twin arranged springs. As most clearly shown in Figure 5, each liner B has top and bottom rearwardly extending arms 22—22 which are left, due to the liner being cut away. The inner faces of the arms 22 form continuations of the friction surface 20 of the liner. At the rear end, on the outer side thereof, each liner is provided with a pair of outstanding lugs 23—23 adapted to engage within the corresponding seat 119 of the adjacent side wall 118 of the cage A. The lugs 23 of the liners snugly fit the seats 119 so that the liners are positively held against longitudinal movement with respect to the cage.

The wedge block C is in the form of a cored hollow casting having a flat transverse front end face bearing directly on the inner side of the main follower 15. At the inner end, the block C is provided with a pair of inwardly converging wedge faces 24 and 25, the wedge face 24 being disposed at a relatively keen wedge acting angle with respect to the longitudinal axis of the mechanism, and the wedge face 25 being disposed at a relatively blunt releasing angle with respect to said axis.

The two friction shoes D and E are interposed between the wedge C and the liners B. The two shoes D and E are of similar design except as hereinafter pointed out. Each shoe is provided with an outer longitudinally disposed flat friction surface 26 adapted to co-operate with the friction surface 20 of the corresponding liner B. On the inner side, each shoe is provided with a lateral enlargement 27 having a wedge face on the forward side thereof. The wedge face of the shoe D is designated by 28 and co-operates with the wedge face 24 of the block C and is correspondingly inclined thereto. The wedge face of the shoe E is designated by 29 and co-operates with wedge face 25 of the block C and is correspondingly inclined thereto. At the inner end, each shoe is cut away as indicated at 30 in Figure 6, thereby leaving top and bottom rearward extensions 31—31. The cut away section 30 is of such a size as to accommodate the outer coil of the corresponding set of the twin arranged main springs F. Each block is also provided with a central recess 32 at the inner end of the enlargement to provide a seat for the front end of the inner coil of the corresponding set of twin springs. By providing the shoes with the rearwardly extending arms 31, relatively long friction surfaces which co-operate with the friction surfaces of the liners are provided. At the same time, the cutting away of the shoes at their inner ends and the cutting away of the liners as indicated at 21 permits of spring resistance elements of maximum length being employed, without materially reducing the effective area of the friction surfaces of the shoes and liners.

The spring follower H is in the form of a relatively heavy plate having rounded ends working within the cut away portions 21 of the two liners B. The plate H is of such a height as to be accommodated between the arms 31 of the friction shoes.

The main spring resistance elements F comprise two sets of twin arranged coils, each set including a relatively heavy outer spring 132 having its opposite ends bearing on the end wall of the spring cage A and the spring follower H, and a lighter inner coil 33 having its rear end bearing on a hollow boss 34 projecting forwardly from the end wall of the spring cage. As clearly shown in Figure 1, two bosses 34 are employed, one of which co-operates with each inner member of the twin arranged springs F. The forward end of the inner coil 33 of each member of the twin arranged springs bears directly on the corresponding friction shoe and engages within the seat 32 thereof. As most clearly shown in Figure 1, the spring follower H is provided with a pair of openings 35 adapted to freely accommodate the front ends of the inner coils of the springs.

The wedge block C is anchored to the spring cage by a pair of retainer bolts G disposed at opposite sides of the mechanism. The head of each bolt G is anchored within the hollow boss 34 at the same side of the mechanism and the shank of the bolt extends through the inner coil 33 of the corresponding member of the spring resistance and through aligned openings in the friction shoe and the wedge block. The head of the bolt is disposed within an opening 35 at the corresponding side of the wedge block C.

The retainer bolts G serve to maintain the mechanism assembled and of overall uniform length. In addition to holding the mechanism assembled, the retainer bolts also serve to maintain the springs under initial compression, thereby compensating for wear of the various friction and wedge faces, the spring follower H being spaced from the front end walls of the cut out sections 21 of the liners B to permit of the forward movement of the spring follower to allow the shoes D and E to be moved forward as the parts become worn. By disposing the retainer bolts on the opposite sides of the mechanism, the wedge C is held in true contact with the wedge faces of the shoes D and E. By providing the two retainer bolts, an unusually rugged means is provided for holding the wedge assembled with the spring cage, it being evident that in disposing the retainer bolts axially within the springs, the maximum diameter of bolts may be utilized.

The operation of my improved shock absorbing mechanism, assuming a compression stroke, is as follows: The main follower 15 and the spring cage A will be moved relatively toward each other, thereby forcing the wedge C inwardly of the cage, carrying the shoes inwardly therewith against the resistance of the springs F and wedging the shoes apart. The shoes will thus be forced into intimate frictional contact with the friction surfaces of the liners B. The described action will continue either until the actuating force is reduced or the front follower 15 engages the outer end of the spring cage, whereupon the actuating force will be transmitted directly through the spring cage, the latter acting as a solid column load transmitting member. Upon release, expansion of the spring resistance elements will force the shoes and spring follower H outwardly, carrying the wedge therewith, until the latter is arrested by the retainer bolts G.

By cutting away the inner ends of the friction shoes and the rear portions of the liners, springs of maximum length and diameter may be employed, thereby greatly increasing the capacity of the gear over gears in which the shoes and liners are not so formed. It will further be evident that by providing the shoes with arms which extend rearwardly and by cutting away only the central portions of the liners, elongated cooperating surfaces are provided on both the liners and the friction shoes, thereby prolonging the life of these parts.

While I have herein shown and described what I now consider the preferred manner of carrying out my invention, the same is merely illustrative, and I contemplate all changes and modifications that come within the scope of the claims appended hereto.

I claim:

1. In a friction shock absorbing mechanism, the combination with a spring cage having a friction shell section at one end thereof provided with a pair of opposed friction surfaces; of a pair of friction shoes co-operating with the friction surfaces; a central wedge block having wedge faces at opposite sides thereof engaging the shoes; twin arranged coil springs within the cage opposing inward movement of the shoes; a pair of retainer bolts anchored to the wedge and cage, said bolts being disposed within and extending through the coils of said twin springs respectively and anchored to the wedge at said opposite sides thereof.

2. In a friction shock absorbing mechanism, the combination with a spring cage of rectangular cross-section; of a pair of liners removably attached to the opposite side walls thereof, said liners presenting inwardly converging friction surfaces; a pair of friction shoes co-operating with the liners, the liners being of such length as to provide bearing for the friction shoes throughout the permissible compression stroke of the mechanism; a central wedge block engaging the shoes; means for anchoring the wedge block to the spring cage; a spring follower co-operating with the shoes; twin arranged sets of springs within the cage and occupying substantially the entire available spring space thereof, each comprising an inner coil bearing directly on the friction shoes and an outer coil bearing on the spring follower, the inner ends of the liners being cut away to accommodate the sides of the outer coils of the twin arranged springs and also to accommodate the opposite sides of the spring follower.

In witness that I claim the foregoing I have hereunto subscribed my name this 9th day of March 1927.

JOHN F. O'CONNOR.